June 29, 1965 G. E. PETTS 3RD., ETAL 3,192,490

HYBRID NETWORK HAVING INTERCONNECTED CENTER
TAPPED AUTOTRANSFORMER WINDINGS
Filed Aug. 23, 1962

WITNESSES
John G. Chopp
James F. Young

INVENTOR
George E. Petts III
Franklin G. Lee
BY
F. H. Henson
ATTORNEY

United States Patent Office 3,192,490
Patented June 29, 1965

3,192,490
HYBRID NETWORK HAVING INTERCONNECTED CENTER TAPPED AUTOTRANSFORMER WINDINGS

George E. Petts 3rd, Cape St. Claire, and Franklin G. Lee, Catonsville, Md., assignors to Westinghouse Electric Corporation, East Pittsburgh, Pa., a corporation of Pennsylvania Filed Aug. 23, 1962, Ser. No. 219,067
8 Claims. (Cl. 333—11)

The present invention relates to hybrid networks and more particularly to all transformer hybrid networks which may be cascaded to provide a substantial plurality of output circuits connected to a single input circuit.

It is known that the all transformer type of hybrid network, as distinct from combination transformer and resistance hybrid networks, is more efficient and therefore less lossy. However, prior to this invention, there have been considerable problems in devising a cascaded all transformer hybrid network with wide band effectiveness such as a band from 2 mc. to 32 mc. due to leakage and shunt inductances of the transformers in the network which have prevented a desirable isolation between all possible output pairs of about −40 db. The conventional combined transformer and resistance hybrid network, in addition to its greater loss is also difficult to design and construct in a manner to provide desirable phase matching of the signals in the output circuits thereof.

It is therefore a principal object of the present invention to provide an all transformer wide band hybrid network that may be cascaded to provided plural output circuits with a minimum of signal strength loss and a maximum of isolation between the signals in the output circuits.

Another important object of the present invention is to provide an improved wide band, all transformer cascaded hybrid network that will assure good in-phase relationships between the output signals in each of the plurality of output circuits.

In accordance with the invention, each of the associated transformer hybrid networks is provided with an input transformer and an output transformer. Compensating means, such as a variable inductor or the like, is connected to the output transformer in a manner to compensate for the open circuit inductance of the input transformer. Additional compensating means, such as a variable inductance in series with a variable resistance or the like, is also connected to the output transformer in a manner to compensate for the leakage inductance of the input transformer and to balance the resistive portion of the impedance connected to the input transformer. In order to provide a large number of well isolated and balanced output circuits from a single input circuit, a plurality of the above-mentioned transformer networks are cascaded and the aforementioned compensating means for each cascaded transformer network are each adjusted to compensate for accumulated shunt inductance and leakage inductance together with resistive impedances of all of the preceding connected transformers and networks.

Figure 1:
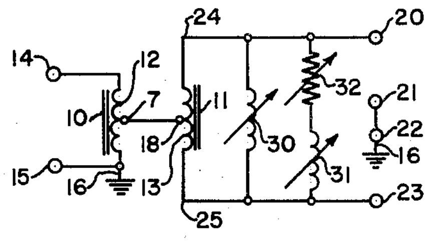
Figure 2:
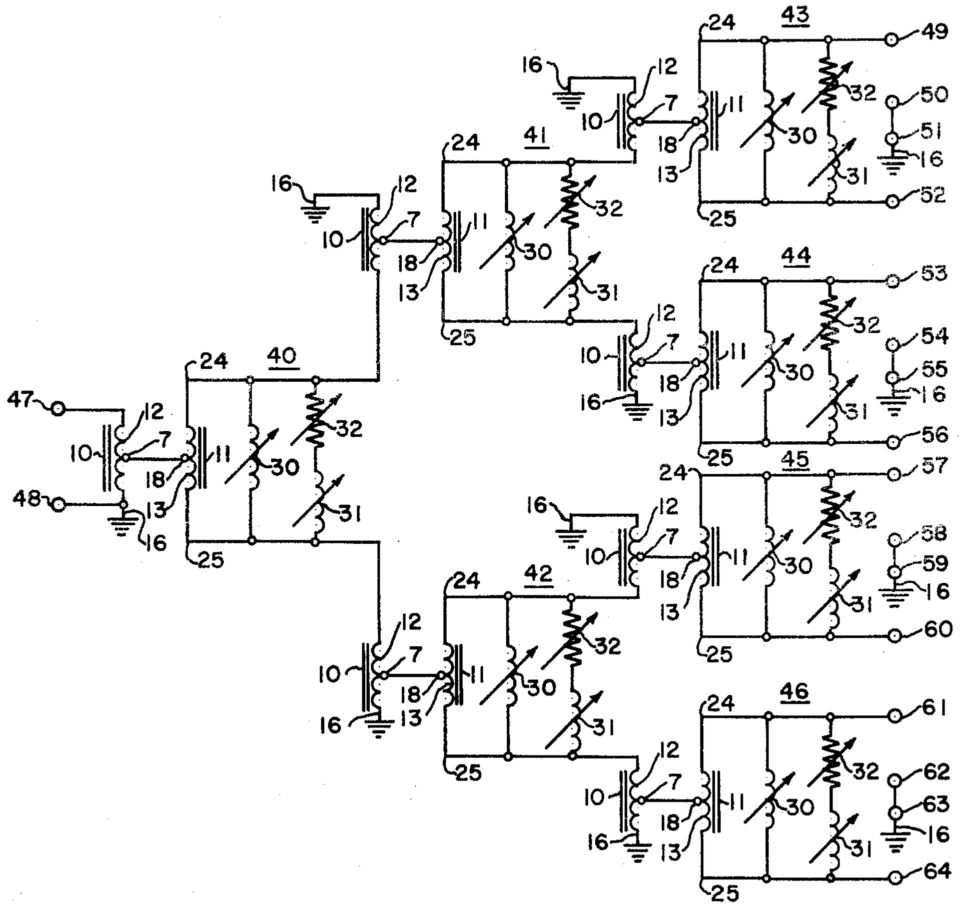

Further objects, features and the attending advantages of the invention will be apparent with reference to the following specification and drawing, in which:

FIGURE 1 is a schematic diagram of an all transformer hybrid network of the invention; and, FIG. 2 is a schematic diagram of a plurality of all transformer hybrid networks connected in cascade relationship in accordance with the invention to provide eight output circuits from a single input circuit.

Referring now to FIG. 1 of the drawing, the all transformer hybrid network of the invention is comprised of an input transformer 10 and an output transformer 11.

Each of the transformers 10, 11 may be of the autotransformer type having a single center-tapped winding. In the form of the invention being described, the transformer 10 has a turns ratio of 7:5. Other turns ratios may be used however and in some cases no transformation ratio may be required. Therefore, transformer 10 is provided with the tapped winding 12 and transformer 11 is provided with a tapped winding 13. Input means consisting of the input terminals 14 and 15 are connected across the winding 12 of input transformer 10 and in addition the input terminal 15 is also connected to a source of reference potential indicated as the ground 16. The tap 17 of input transformer 10 is connected to the tap 18 of output transformer 11. First and second output means consisting of output terminals 20, 21 and 22, 23 are shown with the terminals 21 and 22 connected to the reference potential or ground 16. The output terminal 20 for the first output means is connected to one portion 24 of the output transformer 11 while the other output terminal 23 of the second output means is connected to another portion 25 of the output transformer 11. Thus, a single input signal applied across input terminals 14 and 15 appears as two output signals across output terminals 20, 21 and 22, 23, respectively.

A first compensating means which may preferably be a variable inductor 30 is connected as a shunt inductance across the winding 13 of the output transformer 11 and serves to compensate for the open circuit inductance of the input transformer 10 or any preceding transformer stages such as may be used in a cascaded hybrid network as will be later described in more detail in connection with FIG. 2 of the drawings. In addition, in accordance with the invention, a variable inductance 31 in series with a variable resistance 32 is connected across the output transformer winding 13 to compensate for the leakage inductance of the preceding transformer elements as well as the resistive part of the impedance that each of the hybrid networks sees as a source.

Referring now to FIG. 2 of the drawings, a cascaded arrangement of a plurality of hybrid networks such as that previously described in FIG. 1 of the drawings is shown in an arrangement to provide eight output signals from a single input signal. It is not believed necessary to describe in detail each of the cascaded hybrid networks since such a network has been previously described in detail in connection with FIG. 1 of the drawings. However, as shown by FIG. 2 the two output circuits of a first stage comprising hybrid network 40 are respectively connected to a second stage including second and third hybrid networks 41, 42 whose pair of output circuits are respectively connected to a third stage including fourth and fifth hybrid networks 43, 44 and sixth and seventh hybrid networks 45, 46. Thus, a single input signal applied across input terminals 47 and 48 will appear as eight output signals across the pairs of output terminals 49 through 64. By adjusting the adjustable shunt inductance such as the inductance 30 and the series inductance 31 and adjustable resistor 32 for each of the all transformer hybrid networks 40–46, a minimum of −40 db. of isolation for each of the eight output circuits can be achieved and the loss of the entire cascaded all transformer hybrid network can be held to a minimum. When cascading the basic circuit of FIG. 1 as has been described in connection with FIG. 2 of the drawings each compensating element must take into account the circuit values of all of the previous hybrid stages so that the compensating shunt inductance such as the variable inductance 30 becomes smaller for each successive stage. On the other hand the series inductance such as the inductance 31 becomes larger for each successive stage.

Although the cascade circuit arrangement of FIG. 2 has shown three stages of cascade transformer hybrid networks to thus provide eight output circuits, it should be understood that a greater or lesser number of stages may be employed depending on the number of output circuits desired. For example if an additional stage of hybrid networks is added to give a total of four stages with sixteen output circuits it is found that the desired −40 db of isolation is still obtained with minimum losses.

It is an inherent advantage of the all transformer hybrid network of the invention, that the output signals in each of the output circuits are in substantially exact phase alignment with each other. This is believed due to the fact that the amounts of stray capacity associated with the signal paths to each output circuit in the all transformer hybrid are substantially uniform. Another desirable characteristic of the all transformer hybrid network of the invention has been found to be the low voltage standing wave ratio for the output signals appearing in each of the output circuits such as the eight output circuits shown in connection with the network of FIG. 2 of the drawings.

A typical application of the all transformer hybrid network of the invention when cascaded to provide eight output circuits from a single input circuit is its use as an antenna coupler. Because the all transformer hybrid network of the invention has a relatively low loss due to its high efficiency, a distributed amplifier which may be used in the antenna coupler employing the all transformer hybrid isolation network may be constructed to provide relatively low power output as compared to the power output required for conventional hybrid networks. Also since the distributed amplifier may be of lower gain than the type which would be used with the conventional combination transformer resistance hybrid network, additional feedback can be applied to the amplifier to reduce the third order intermodulation distortion in the output signals of the amplifier as applied to the hybrid network.

Various modifications will occur to those skilled in the art within the spirit of the invention. For example, capacitors may be added to the balancing network to compensate for stray capacity in the windings.

We claim as our invention:

1. A wide band transformer hybrid network comprising, a source of reference potential, an input transformer having a tapped winding, an output transformer having a tapped winding, input means including a pair of terminals connected across the winding of said input transformer with one terminal also connected to said source of reference potential, means connecting the tap of said input transformer to the tap of said output transformer, first output means including a pair of terminals with one terminal connected to said source of reference potential and the second terminal connected to a first portion of the output transformer winding other than the winding tap, second output means including a pair of terminals with one terminal connected to said source of reference potential and the other terminal connected to a second portion of the output transformer other than the winding tap and said first portion, means connected to said output transformer to compensate for the open circuit inductance of said input transformer, and means connected to said output transformer to compensate for the leakage inductance of said input transformer and to balance the resistive portion of the impedance connected to said input transformer.

2. A wide band transformer hybrid network comprising, a source of reference potential, an input transformer having a center-tapped winding, an output transformer having a center-tapped winding, input means including a pair of terminals connected across the winding of said input transformer with one terminal also connected to said source of reference potential, means connecting the tap of said input transformer to the tap of said output transformer, first output means including a pair of terminals with one terminal connected to said source of reference potential and the second terminal connected to a first portion of the output transformer winding other than the winding tap, second ouput means including a pair of terminals with one terminal connected to said source of reference potential and the other terminal connected to a second portion of the output transformer other than the winding tap and said first portion, means connected to said output transformer to compensate for the open circuit inductance of said input transformer, and means connected to said output transformer to compensate for the leakage inductance of said input transformer and to balance the resistive portion of the impedance connected to said input transformer.

3. A wide band transformer hybrid network comprising, a source of reference potential, an input transformer having a tapped winding, an output transformer having a tapped winding, input means including a pair of terminals connected across the winding of said input transformer with one terminal also connected to said source of reference potential, means connecting the tap of said input transformer to the tap of said output transformer, first output means including a pair of terminals with one terminal connected to said source of reference potential and the second terminal connected to a first portion of the output transformer winding other than the winding tap, second output means including a pair of terminals with one terminal connected to said source of reference potential and the other terminal connected to a second portion of the outer transformer other than the winding tap and said first portion, variable inductance means connected to said ouput transformer to compensate for the open circuit inductance of said input transformer, and variable inductance means in series with variable resistance means connected to said output transformer to compensate for the leakage inductance of said input transformer and to balance the resistive portion of the impedance connected to said input transformer.

4. A wide band transformer hybrid network comprising, a source of reference potential, an input transformer having a center-tapped winding, an output transformer having a center-tapped winding, input means including a pair of terminals connected across the winding of said input transformer with one terminal also connected to said source of reference potential, means connecting the tap of said input transformer to the tap of said output transformer, first output means including a pair of terminals with one terminal connected to said source of reference potential and the second terminal connected to a first portion of the output transformer winding other than the winding tap, second output means including a pair of terminals with one terminal connected to said source of reference potential and the other terminal connected to a second portion of the output transformer other than the winding tap and said first portion, variable inductance means connected to said output transformer to compensate for the open circuit inductance of said input transformer, and variable inductance means in series with variable resistance means connected to said output transformer to compensate for the leakage inductance of said input transformer and to balance the resistive portion of the impedance connected to said input transformer.

5. A wide band cascaded transformer hybrid network comprising; a source of reference potential; a plurality of associated transformer networks; each transformer network including, an input transformer having a tapped winding, an output transformer having a tapped winding, input means including a pair of terminals connected across the winding of said input transformer with one terminal also connected to said source of reference potential, means connecting the tap of said input transformer to the tap of said output transformer, first output means including a pair of terminals with one terminal connected to said source of reference potential and the second terminal connected to a first portion of the output transformer winding other than the winding tap, second output means including a pair of terminals with one terminal connected to said source of reference potential and the other terminal connected to a second portion of the output transformer other than the winding tap and said first portion, means connected to said output transformer to compensate for the open circuit inductance of said input transformer, means connected to said output transformer to compensate for the leakage inductance of said input transformer and to balance the resistive portion of the impedance connected to said input transformer; and means connecting the input means of each succeeding transformer network to a respective one of the output means of a preceding transformer network to thereby provide a plurality of output means connected to a single input means.

6. A wide band cascaded transformer hybrid network comprising; a source of reference potential; a plurality of associated transformer networks; each transformer network including, an input transformer having a center-tapped winding, an output transformer having a center-tapped winding, input means including a pair of terminals connected across the winding of said input transformer with one terminal also connected to said source of reference potential, means connecting the tap of said input transformer to the tap of said output transformer, first output means including a pair of terminals with one terminal connected to said source of reference potential and the second terminal connected to a first portion of the output transformer winding other than the winding tap, second output means including a pair of terminals with one terminal connected to said source of reference potential and the other terminal connected to a second portion of the output transformer other than the winding tap and said first portion, means connected to said output transformer to compensate for the open circuit inductance of said input transformer, means connected to said output transformer to compensate for the leakage inductance of said input transformer and to balance the resistive portion of the impedance connected to said input transformer; and means connecting the input means of each succeeding transformer network to a respective one of the output means of a preceding transformer network to thereby provide a plurality of output means connected to a single input means.

7. A wide band cascaded transformer hybrid network comprising; a source of reference potential; a plurality of associated transformer networks; each transformer network including, an input transformer having a tapped winding, an output transformer having a tapped winding, input means including a pair of terminals connected across the winding of said input transformer with one terminal also connected to said source of reference potential, means connecting the tap of said input transformer to the tap of said output transformer, first output means to said source of reference potential and the second terminal connected to a first portion of the output transformer winding other than the winding tap, second output means including a pair of terminals with one terminal connected to said source of reference potential and the other terminal connected to a second portion of the output transformer other than the winding tap and said first portion, variable inductance means connected to said output transformer to compensate for the open circuit inductance of said input transformer, variable inductance means in series with variable resistance means connected to said output transformer to compensate for the leakage inductance of said input transformer and to balance the resistive portion of the impedance connected to said input transformer; and means connecting the input means of each succeeding transformer network to a respective one of the output means of a preceding transformer network to thereby provide a plurality of output means connected to a single input means.

8. A wide band cascaded transformer hybrid network comprising; a source of reference potential; a plurality of associated transformer networks; each transformer network including, an input transformer having a center-tapped winding, an output transformer having a center-tapped winding, input means including a pair of terminals connected across the winding of said input transformer with one terminal also connected to said source of reference potential, means connecting the tap of said input transformer to the tap of said output transformer, first output means including a pair of terminals with one terminal connected to said source of reference potential and the second terminal connected to a first portion of the output transformer winding other than the winding tap, second output means including a pair of terminals with one terminal connected to said source of reference potential and the other terminal connected to a second portion of the output transformer other than the winding tap and said first portion, variable inductance means connected to said output transformer to compensate for the open circuit inductance of said input transformer, variable inductance means in series with variable resistance means connected to said output transformer to compensate for the leakage inductance of said input transformer and to balance the resistive portion of the impedance connected to said input transformer; and means connecting the input means of each succeeding transformer network to a respective one of the output means of a preceding transformer network to thereby provide a plurality of output means connected to a single input means.

References Cited by the Examiner

UNITED STATES PATENTS

| | | | |
|---|---|---|---|
| 2,207,531 | 7/40 | Botsford | 333—11 |
| 2,909,733 | 10/59 | Walter | 333—11 |

OTHER REFERENCES including a pair of terminals with one terminal connected

Thiele: "A Hybrid Network for Mixing and Splitting Signals," Proceedings of the I.R.E. Australia, pages 383 to 387 relied upon.

HERMAN KARL SAALBACH, *Primary Examiner.*